INVENTOR
WILLIAM J. WALSH

BY Charles S. Hall
ATTORNEY

INVENTOR
WILLIAM J. WALSH

BY Charles S. Hall
ATTORNEY 3,430,152

DUAL-FEEDBACK STABILIZED DIFFERENTIAL FOLLOWER AMPLIFIER

William J. Walsh, Detroit, Mich., assignor to Burroughs Corporation, Detroit, Mich., a corporation of Michigan Filed June 10, 1965, Ser. No. 462,934
U.S. Cl. 330—2 8 Claims
Int. Cl. H03f *1/34*; G01r *19/10*

ABSTRACT OF THE DISCLOSURE

A differential follower amplifier and a test circuit actuated thereby which is responsive to a single input for establishing a plurality of test conditions at the electrodes of a transistor under test. The differential follower amplifier is a type of operational amplifier which is used as part of the test circuit for determining the forward gain of a transistor in the grounded emitter configuration.

This invention relates to an electronic voltage follower amplifier and more particularly to an improved precision voltage follower amplifier and to a test circuit actuated thereby for determining the forward gain of transistors in the grounded emitter configuration.

In order to efficiently utilize transistors in electronic circuits, particularly where reliability is an important factor, the design engineer must accurately know the parameters of the transistor. Because of the mass production techniques utilized to manufacture transistors, various parameters, for example, the forward current gain factor, may vary widely for a given batch of transistors of a specific type. This wide variation of parameters frequently necessitates the testing and sorting of transistors to determine their useability in a particular circuit configuration.

Transistors and other electrical components may be purchased either in shelf or batch lots wherein the parameters are likely to vary widely, or in accordance with predetermined purchase order specifications wherein the specified parameters will vary only within prescribed limits. In the latter case the manufacturer tests and sorts the various elements to insure that the parameters are held within the purchase order specifications. However the purchase of matched or closely controlled elements greatly increases the cost per item.

One parameter commonly specified to determine the useability of a particular transistor is the D.C. forward transfer gain factor designated $h_{fe}$. The current gain factor with a transistor in the grounded emitter configuration is defined as the ratio of the collector current, $I_c$, to the base current, $I_b$, at a fixed value of collector to emitter potential. Since the forward transfer current gain factor $\beta$ is a function of the collector to emitter voltage and the collector current, both of these quantities must be accurately specified.

Several types of commercial test equipment are available for measuring the current gain, as well as other parameters of a transistor. However, these commercial test apparatus are relatively costly and generally require a skilled operator. Further all the reasonably priced, commercially available test equipment of which applicant is aware tests the transistors in the active region rather than the saturated region. For certain applications, particularly in the computer art, it is often desirable to economically test transistors in the saturated region.

It is therefore an object of the present invention to simplify the determination of the gain factor of transistors in the saturated conduction region.

It is another object of the present invention to provide a low cost, precision voltage follower test circuit for automatically establishing a plurality of test conditions in response to the application of a single test signal.

It is a further object of the present invention to provide an automatically calibrating, precision voltage follower test circuit for determining the forward gain of a transistor in response to the application of a single, selectively variable input signal.

It is a still further object of the present invention to provide a dual-feedback controlled differential follower amplifier.

It is yet another object of the present invention to provide a simple, easily operated precision voltage follower differential amplifier circuit for determining the forward gain factor of transistors in the common emitter configuration.

In pursuance of these objects applicant has discovered not only a circuit for automatically and precisely determining the forward gain of a transistor in response to a single, selectively variable input signal but, also, as an integral part thereof, has invented a highly precise, voltage follower differential amplifier circuit.

In accordance with the principles of applicant's invention, the output of a two-input differential amplifier is connected by proportioned resistive feedback circuits to the inputs of the amplifier, the inputs being also respectively connected by a pair of proportional resistive means to circuit input terminals forming a differential operational amplifier. This is commonly referred to as a negative or degenerative feedback. The base of a transistor to be tested is resistively connected to the output of the differential amplifier. The emitter of the transistor to be tested is grounded and the collector is connected both to one of the circuit input terminals and, through a resistance, to a voltage source thus forming a feedback network and a bias network respectively.

In operation a first potential level is initially established across the collector emitter junction of the transistor under test through the collector resistor of the bias network. In response to the application of a reference potential to the free input terminal, the differential amplifier automatically supplies base current to the transistor under test. The magnitude of the base current is controlled by the operation of the feedback network which in conjunction with the proportional resistive circuits develops a feedback signal to insure that the initially established potential at the collector electrode stabilizes at a level substantially equal to the input reference potential. An ammeter may be employed in the base circuit and this meter may be calibrated to read directly the forward current gain factor of the transistor under test. Alternately the current gain factor may be calculated from the known values of collector and base currents.

Applicant has further discovered that the large fixed gain factor of a conventional differential operational amplifier may be conveniently controlled by employing a symmetrically resistive negative feedback network. Further by replacing one of the sources of signal voltage with an additional feedback loop coupled between the output of the differential amplifier and one branch of the symmetric feedback network, applicant has discovered that a conventional differential amplifier may be utilized as a precision voltage follower having a variable gain factor.

The precision voltage follower differential amplifier having a variable gain factor may comprise a two input differential amplifier, an input terminal, first resistive means for coupling the input terminal to a first input of a differential amplifier, second resistive means equal in magnitude to the first resistive means having one end thereof coupled to the other of the inputs of the differential amplifier, first feedback means including a pair of matched resistors for individually interconnecting the output of the differential amplifier and the respective common junctions of the first and second resistive means and the first and other inputs of differential amplifier, load means coupled between the output of the differential amplifier and a source of reference potential, and second feedback means interconnecting the common junction of the load means and the output of the differential amplifier and the other side of the second resistive means.

In operation, with a reference voltage applied to the input terminal the output voltage across the load automatically stabilizes at a level substantially equal to the reference voltage. The output level of a differential amplifier without feedback may be described as a constant, K, times the difference in signal levels applied to the respective inputs of the differential amplifier. When a reference voltage is initially applied to the input terminal, the potential difference across the two inputs of the differential amplifier results in the generation of an output signal level proportional to the gain factor of the amplifier without feedback times the magnitude of the potential difference. A signal fed back via the first and second feedback paths insures that after the initial transient response the output of the differential amplifier will stabilize at a level substantially equal to the input signal. As hereinafter to be fully explained the gain factor of applicant's differential operational amplifier circuit may conveniently be varied as a function of the quantity $$K/\frac{R_f}{R_i+R_f}$$

where $R_i$ is the value of the input or external resistors associated with the respective input terminals of the differential amplifier, K is the gain factor of the amplifier without feedback and $R_f$ is the value of the feedback resistors.

For a more complete understanding of the various embodiments of applicant's invention reference may be had to the following detailed description in conjunction with the accompanying drawings in which.

Figure 1:
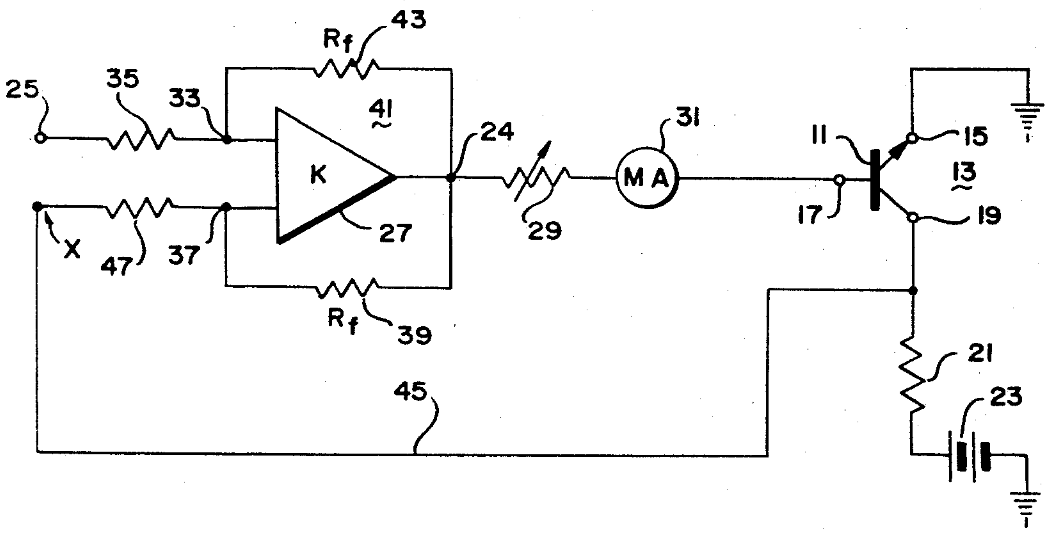
FIG. 1 is a schematic drawing illustrating a transistor beta test circuit embodying the principles of applicant's invention.

Referring now to FIG. 1 there is shown a transistor beta ($\beta$) tester in accordance with the principles of applicant's invention. The transistor 11 to be tested is inserted in a transistor test socket 13 having jacks 15, 17 and 19 for receiving the emitter, base and collector electrodes, respectively. The emitter jack 15 is connected to a suitable source of reference potential, for example, ground and the collector test jack 19 is connected via current limiting resistor 21 to a source of bias potential, for example, a battery 23. The base electrode jack 17 is coupled to an output terminal 24 of operational amplifier 27 via a series circuit including a current limiting resistor 29 and ammeter 31.

The differential amplifier 27 has a first input 33 connected to an input terminal 25 via resistor 35. The other input 37 of amplifier 27 is connected through resistor 39 of the feedback circuit 41 to the output 24 of the differential operational amplifier. A second feedback resistor 43 interconnects the output of the differential amplifier and input terminal 33 of the differential amplifier. Conductor 45 interconnects the junction of the current limiting resistor 21 and the collector jack 19 and one end of resistor 47 which has the other end coupled to input 37 of the differential amplifier 27. The two pairs of input and feedback resistors are preferably matched precision resistors, however, as will hereinafter be more fully explained, they may, in accordance with the broadest aspects of applicant's invention, comprise proportioned resistive pairs.

Differential operational amplifier 27 may be of any type well known in the art. For example, type SK2–V, which is sold commercially by Philbrick Researchers, Boston, Mass., has been utilized by applicant in a representative embodiment of this beta tester. For a still further understanding of the structure and operation of conventional differential DC amplifiers which may be utilized in practicing the various embodiments of applicant's invention, reference may be had to the text Electronic Analog Computers, 2d Edition, by Korn and Korn, published by McGraw-Hill Book Company in 1956.

In operation the transistor to be tested is inserted into the test jack 13 and a suitable source of potential, for example, battery 23, is utilized to establish an operating bias across the collector-emitter junction, i.e., jacks 19 and 15, respectively. The DC operational amplifier 27 is a differential type and operates in such a manner that the voltage differential across its inputs is very close to zero volts. Because of this operating feature and because the pair of resistors 35 and 47 associated with the inputs of the operational amplifier and the pair of feedback resistors 39 and 43 are, respectively substantially of equal value, the voltage at point X, i.e., the junction of conductor 45 and resistor 47, in the feedback loop must stabilize at a level approximately equal to the input potential level applied to terminal 25. When a source of test potential is applied to input terminal 25 the output voltage of the differential amplifier when divided with the resistor in the base circuit of the transistor under test defines the appropriate value of base current for the collector emitter potential level which, as hereinabove stated, due to the feedback network, stabilizes at a level corresponding to the input potential level at terminal 25. Thus the feedback controlled operational amplifier in response to the application of a single test potential automatically supplies a quantity of base current to the transistor under test and simultaneously establishes a test potential across the collector emitter electrodes. To measure the beta of the transistor under test at other values of collector current, the reference potential applied to the input terminal 25 may be successively adjusted in accordance with a predetermined series of levels. In accordance with applicant's teaching the value of resistor 21 is chosen to provide the appropriate value of collector current and the reference potential applied to input terminal 25 is chosen to correspond to the desired collector emitter voltage. To achieve the wide range of test data, it may be necessary to adjust the value of variable resistor 29 to insure that the respective output levels of the differential amplifier results for each test signal in an appropriate magnitude of base current corresponding to each desired test value.

Figure 2:
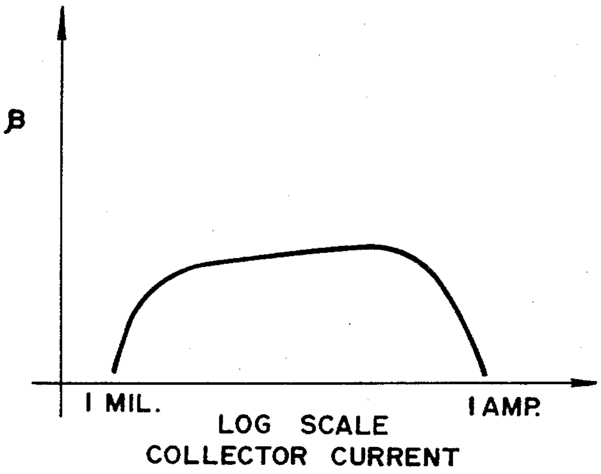
FIG. 2 is a curve illustrating the variation of the forward gain transfer characteristic $\beta$ of a transistor as a function of collector current.

Referring now to FIG. 2 there is shown a typical curve illustrating the variation of beta as a function of collector current. As hereinabove stated for certain applications and particularly for computer circuitry applications, it is desirable to determine certain parameters of a transistor in the saturated region. The curve illustrates the variation of beta as a function of widely varying values of collector current. The data for such a graphical representation of beta as a function of collector current may be conveniently derived by employing applicant's test circuit shown in FIG. 1 by applying to input terminal 25 an appropriate series of test or reference potential levels. The values of the series of test potential levels applied to input terminal 25 may conveniently be calculated by multiplying the value of the collector current at the desired test points by the value of collector resistor 21 because in the operation of applicant's circuit the potential at the collector electrode automatically stabilizes, as explained hereinabove, to the test potential level. Further the value of the base resistor is chosen such that the output potential level of the operational amplifier 27 divided by the resistance of the current limiting resistor 29 in the base circuit defines the appropriate values of base current for the corresponding test potentials.

Figure 3:
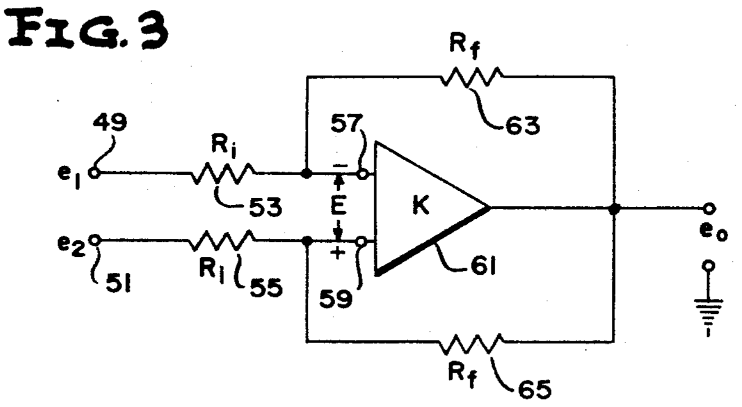
FIG. 3 is a schematic diagram of a differential amplifier circuit embodying another aspect of applicant's invention.

Referring now to FIG. 3 there is shown a differential amplifier circuit embodying the principles of applicant's invention to achieve a variable open loop gain characteristic. The differential amplifier may be any type well known in the art, for example, the hereinabove mentioned model SK2–V differential operational amplifier. As shown, applicant's variable gain differential amplifier circuit comprises first and second input terminals 49 and 51 coupled via resistors 53 and 55 to the respective inputs 57 and 59 of the differential amplifier 61. As hereinabove stated the differential amplifier 61 may be of any type well known in the art in which the difference of the signal levels appearing at the respective inputs is amplified by a fixed gain factor. In accordance with the principles of applicant's invention a pair of feedback resistors 63 and 65 couple the output of differential amplifier 61 to common junctions of the input resistors 53 and 55 and the respective inputs 57 and 59 of the differential amplifier 61.

In operation with signals $e_1$ and $e_2$ applied to the respective input terminals 49 and 51, the voltage level $e_0$ developed at the output of the differential amplifier is a function of the relative magnitudes of the respective input signals. Further it will be shown that the magnitude of the signal $e_0$ at the output of the differential amplifier is also a function of the gain factor of the amplifier without feedback times a constant proportional to the ratio of the input and feedback resistors respectively.

The operation of applicant's variable gain differential amplifier circuit may best be understood by considering the following mathematical analysis of the circuit. The voltage E appearing across the inputs of the differential amplifier with $e_1$ and $e_2$ applied to the input terminals 49 and 51 may be expressed as:

Equation 1
$$E=\frac{e_2G_1+e_0G_f}{G_1+G_f}-\frac{e_1G_1+e_0G_f}{G_1+G_f}$$

where E is the magnitude of the voltage appearing across the respective inputs of the differential amplifier and $G_1$ and $G_f$ are the conductance of the input and feedback resistors respectively. Since by definition the output of the differential amplifier $e_0$ equals this differential E times the gain factor K, i.e.:

Equation 2
$$e_0=EK$$

then, substituting this value, Equation 1 may be rewritten as:

Equation 3
$$\frac{e_0}{K}=\frac{e_2G_1+e_0G_f-e_1G_1-e_0G_f}{G_1+G_f}=\frac{(e_2-e_1)G_1}{G_1+G_f}$$

Now defining the difference between the respective voltages applied to the inputs of the differential amplifier as:

Equation 4
$$\Delta e=e_2-e_1$$

Then Equation 3 may be rewritten as:

Equation 5
$$\frac{e_0}{K}=\frac{\Delta eG_1}{G_1+G_f}$$

or

Equation 6
$$\frac{e_0}{\Delta e}=\frac{KG_1}{G_1+G_f}$$

Substituting the resistive equivalents of the respective conductances into Equation 6 yields:

Equation 7
$$\frac{e_0}{\Delta e}=\frac{K\frac{1}{R_1}}{\frac{1}{R_1}+\frac{1}{R_f}}=\frac{KR_f}{R_1+R_f}$$

Thus it may be seen that by utilizing practical sized resistors it is possible in accordance with the principles of applicant's invention to conveniently control the open loop gain factor K of the differential amplifier 61.

Figure 4:
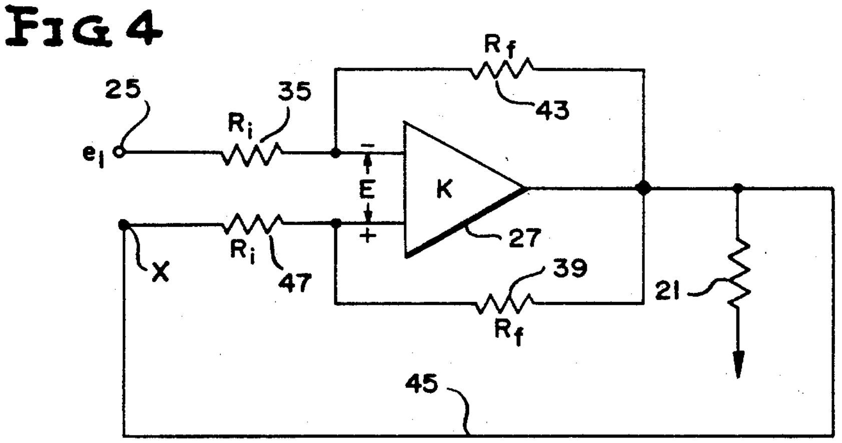
FIG. 4 is a schematic diagram of a precision voltage follower circuit in accordance with another aspect of applicant's invention.

Referring now to FIG. 4 there is shown a precision voltage follower circuit in accordance with another aspect of the principles of applicant's invention. Applicant's precision voltage follower circuit employs the differential amplifier having variable open loop gain characteristics as set forth in FIG. 3. To convert the variable gain differential ampifier circuit as shown in FIG. 3 to a precision voltage follower applicant has replaced the input source shown as $e_2$ in FIG. 3 with a feedback signal derived from a junction of the output of the differential amplifier and load impedance. A signal proportional to the output voltage of the differential amplifier is thus applied through an input resistance as one input of the differential amplifier. As hereinabove stated the operational amplifier may be of any type well known in the art. The operation of the differential amplifier is such that the voltage across its inputs is very close to zero volt. Because of this operating quality and because of the hereinabove mentioned equality of the respective pairs of feedback and input resistors the voltage at point X, i.e. the junction of resistor 47 and conductor 45, of the feedback loop must stabilize at a level substatially equal to the input potential applied to the input terminal 25.

As the circuit configuration of the precision follower circuit shown in FIG. 4 is quite similar to the test circuit shown in FIG. 1 it is not believed necessary to further discuss the structural circuit features of the particular embodiment shown in FIG. 4. However for convenience like components in the respective figures are similarly numbered.

The operation of applicant's voltage follower circuit may be further understood by considering the mathematical analysis of the operation of the circuit. The voltage E appearing across the respective inputs of the differential amplifier 27 with an input potential $e_1$ applied to the input terminal 25 may be expressed as:

Equation 8
$$E=\frac{e_oG_1+e_oG_f}{G_1+G_f}-\frac{e_1G_1+e_oG_f}{G_1+G_f}$$

where $e_0$ is, as above, the voltage appearing at the output terminal of differential amplifier 27 and $G_1$ and $G_f$ are the conductance of the input and feedback paths respectively. Since by definition the output of the differential amplifier $e_0$ is equal to the voltage differential across the inputs E times the gain factor K, i.e., Equation 9
$$e_0=EK$$

then Equation 8 may be rewritten utilizing this definition for the output voltage $e_0$ as:

Equation 10
$$\frac{e_o}{K}=\frac{(e_o-e_1)G_1}{G_1+G_f}$$

Further the error signal or difference between the output $e_0$ and the input $e_1$ may be defined as:

Equation 11
$$\Delta e=e_0-e_1$$

Utilizing this definition for the error voltage, Equation 10 may be rewritten as:

Equation 12
$$\frac{e_0}{K}=\frac{\Delta eG_1}{G_1+G_f}$$

or

Equation 13

$$\Delta e=\frac{e_0}{K}\left(\frac{G_1+G_f}{G_1}\right)=\frac{e_0}{K}\left(\frac{R_f+R_1}{R_f}\right)$$

Thus it may be seen that for ordinary types of differential amplifiers having gains in order of 100,000 the error will be quite small. Further, as in the embodiment of applicant's differential amplifier circuit illustrated in FIG. 3, the open loop gain may be conveniently controlled as a function of the ratio of the respective input and feedback resistors times the gain of the differential amplifier without feedback. From the analysis of applicant's differential amplifier circuits illustrated in FIGS. 3 and 4 it follows from Equations 5 and 13 that the generalized transfer function may be expressed as:

Equation 14

$$\frac{e_0(S)}{\Delta e(S)}=\frac{KZ_f}{(z_1+z_f)(S+a)}$$

where $Z_f$ and $Z_1$ are generalized impendance elements utilized in place of the input and feedback resistors respectively.

In the preferred embodiments of applicant's transistor test circuit, differential amplifier circuit and precision voltage follower circuit, the respective input or external resistors, $R_1$, and feedback resistors $R_f$ comprise matched resistive pairs. However to weight a particular circuit parameter or to develop an output signal which is proportional to some function of the respective input or feedback signals, it is possible to utilize input and feedback resistive pairs in which the resistors are proportional to some predetermined ratio. In the description of the transistor test circuit of FIG. 1 and the mathematical analysis of the circuits of FIGS. 3 and 4 it was assumed for purposes of simplification that the input and feedback resistors comprise matched pairs. However these examples are by way of illustration only and the resistive values of the respective resistors may be varied to enable the circuit to perform any desired function. As would be evident to those skilled in the art any conductive circuit means, for example, conductors and/or any combination of distributed or lumped resistors may be utilized to modify a standard operational differential amplifier to function as a precision voltage follower in accordance with the principles of applicant's teaching.

Figure 5:
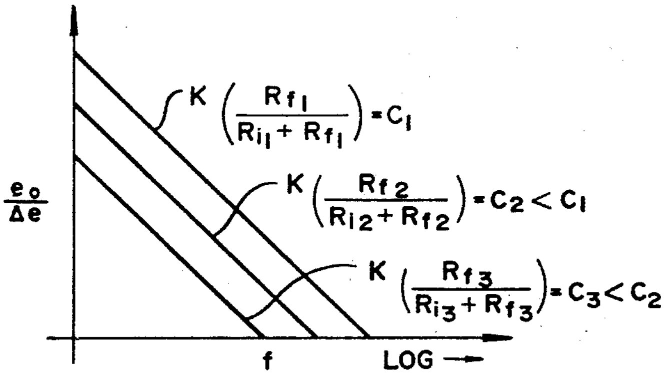
FIG. 5 is a family of curves illustrating the variation of gain factor as a function of frequency of a differential amplifier embodying the principles of applicant's invention.

Referring now to FIG. 5 there is shown a family of curves illustrating the variation of gain as a function of frequency for a precision voltage follower circuit embodying the principles of applicant's invention. As shown the magnitude of the gain factor is a constant depending upon the respective ratio of the input and feedback resistors ($R_1>R_2>R_3$) times the open loop gain of the differential amplifier without feedback. Further as shown the magnitude of the gain factor falls off linearly with increasing frequency. As would be evident to those skilled in the art the gain factor as a function of frequency may be adjusted to conform with any circuit requirements depending upon the particular application intended.

As would be evident to those skilled in the art many minor modifications may be made in applicant's precision voltage follower differential amplifier circuits without departing from th scope of applicant's invention.

1. A proportional voltage follower amplifier comprising:

a two input single output differential operational amplifier, a pair of input terminals.

first and second proportionally valued resistive means individually coupling said input terminals to said input of said operational amplifier to form first and second junctions, third and fourth proportionally valued resistive means for respectively coupling said single output of said operational amplifier to said first and second junctions to form negative feedback paths, and circuit means for coupling said single output of said operational amplifier to one said input terminals.

2. The circuit defined in claim 1 wherein said resistive means comprise precision fixed resistors and wherein said first and second resistive means and said third and fourth resistive mean are respectively substantially equal in value.

3. A precision voltage follower amplifier comprising:

a two-input single output voltage feedback amplifier characterized by high gain, negative amplification, and low input impedance and responsive to the difference in potential across its inputs such that this difference in potential is close to zero volts, input terminal means for receiving input signals, said input terminals operably connected to said inputs, first resistive means for coupling said input terminal means to one of said inputs of said amplifier to form a junction, second circuit means for coupling said single output of said amplifier to the other input of said amplifier, and for coupling said single output to said other input terminal, and third circuit means for coupling said single output of said amplifier to said junction.

4. The amplifier of claim 3 wherein said second and said third circuit means comprise resistive means.

5. A test circuit for determining the forward current amplification factor of transistor in the grounded emitter configuration comprising:

a test socket having a plurality of jacks for receiving the respective emitter, base and collector leads of a transistor under test, a source of input potential, first circuit means for developing an operating potential across the collector emitter jacks of the test socket, second circuit means including a current limiting resistor for coupling base current to the base jack of said test socket, and means including a feedback controlled differential operational amplifier for supplying substantially constant base current to said second circuit means in response to said source of input potential and for stabilizing the operating potential level across the collector emitter jacks of the test socket at a level substantially equal to said source of input potential.

6. A test circuit for determining the forward gain of a transistor comprising:

a test socket having a plurality of jacks for receiving the respective emitter, base and collector leads of a transistor under test, first circuit means including a current limiting resistor for establishing an operating bias across the collector emitter jacks, second circuit means including a limiting resistor and an ammeter in series therewith for coupling a source of base current to said base jack, a source of input potential.

a two input differential operational amplifier, a pair of input terminals, first and second substantially matched resistive means for coupling said input terminals individually to said inputs of said operational amplifier, third and fourth substantially matched resistive means for coupling the output of said operational amplifier to individual junctions of said first and second resistive means and said inputs of said operational amplifier respectively, third circuit means for coupling the output of said operational amplifier to said second circuit means and feedback means coupled between the collector jack and one of said input terminals whereby the level of base current is limited to a predetermined quantity as a function of said source of input potential applied to the other of said input terminals.

7. The test circuit of claim 6 wherein said first and second resistive means and said third and fourth resistive means comprise substantially equal value fixed resistors.

8. A test circuit for evaluating the forward gain of a transistor in the grounded emitter configuration comprising:

a test socket having a plurality of jacks for receiving the emitter, base and collector leads respectively of a transistor under test, a source of input potential, first circuit means for establishing a relatively constant collector current at the collector jack, said first circuit means including means to establish an operating potential across the collector emitter junction of a transistor under test, and second circuit means for establishing a relatively constant base current at the base jack, said second means including a feedback controlled differential operational amplifier responsive to an input potential for stabilizing said operating potential at a level substantially equal to said input potential.

References Cited

UNITED STATES PATENTS

| | | | |
|---|---|---|---|
| 2,897,448 | 4/1963 | Raishek | 330—2 X |
| 3,088,076 | 5/1963 | Burwen | 330—9 |
| 3,089,097 | 7/1959 | Bell | 330—9 |

NATHAN KAUFMAN, *Primary Examiner.*

U.S. Cl. X.R.

33—84, 103, 26, 28